Feb. 17, 1942. T. R. HARRISON 2,273,191

MEASURING AND CONTROL APPARATUS

Original Filed Dec. 23, 1937  2 Sheets—Sheet 1

INVENTOR
THOMAS R. HARRISON
BY
ATTORNEY

Feb. 17, 1942.      T. R. HARRISON      2,273,191
MEASURING AND CONTROL APPARATUS
Original Filed Dec. 23, 1937     2 Sheets-Sheet 2
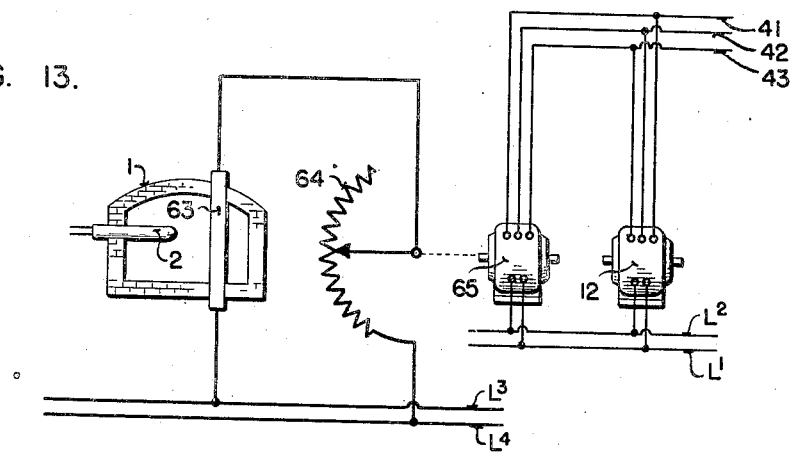
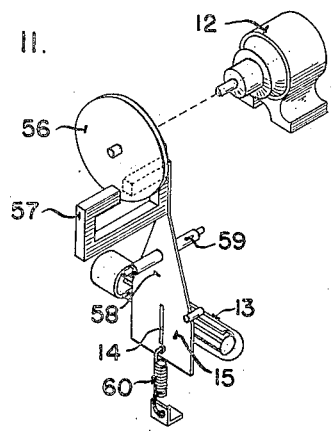
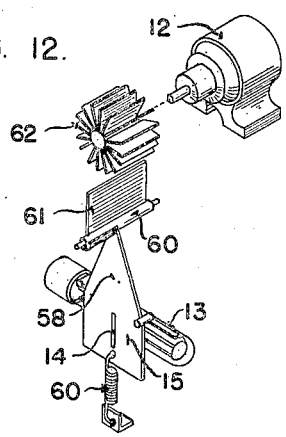
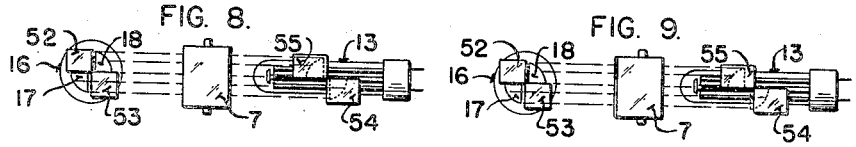
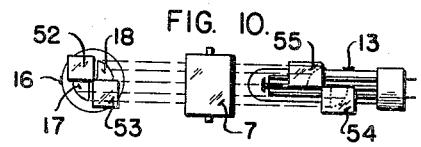
INVENTOR
THOMAS R. HARRISON
BY
ATTORNEY Patented Feb. 17, 1942

2,273,191

UNITED STATES PATENT OFFICE 2,273,191

MEASURING AND CONTROL APPARATUS

Thomas R. Harrison, Wyncote, Pa., assignor to The Brown Instrument Company, Philadelphia, Pa., a corporation of Pennsylvania Original application December 23, 1937, Serial No. 181,309, now Patent No. 2,172,064, dated September 5, 1939. Divided and this application August 26, 1939, Serial No. 292,061

8 Claims. (Cl. 172—278)

The present invention is a division of my prior application bearing Serial Number 181,309 which was filed December 23, 1937 and issued September 5, 1939, into Patent No. 2,172,064, and which discloses various arrangements for producing recording and/or controlling effects in response to small deflections of the most sensitive measuring instruments.

The various arrangements disclosed in my prior application were devised by me with the general objects in view of providing a highly accurate measuring and/or controlling system which is quick in its action and does not overrun or hunt, and such other objects as may be obtained by the utilization of the apparatus and principles set forth in my prior application, and herein in the many relations in which the combinations claimed as novel with me and their equivalents, may be adapted by those skilled in the art.

The improvements claimed herein are improvements in measuring and/or controlling apparatus in which an element deflecting in accordance with changes in the value of a quantity to be measured and/or controlled is included in an instrument comprising an electronic relay mechanism which is adapted to continuously produce recording and/or controlling effects in accordance with the deflections of said deflecting element.

A general object of the present invention is to provide improved electronic relay apparatus for producing recording and/or controlling effects in accordance with the variations in a variable condition.

The general principles of the invention disclosed in my said prior application are of especial advantage when utilized, as disclosed and claimed herein in controlling a reversible electric relay motor which is adapted to operate in one direction or the other, or to stall, accordingly as one or the other of two energizing actions is impressed on the motor or both energizing actions are impressed in rapid alternation thereon. The operation of such a motor in this manner for recording and control purposes avoids the overrunning or coasting experienced with prior art devices.

The use of such a motor controlled in the manner disclosed and claimed herein is especially advantageous, for example, when used in a self-balancing potentiometer instrument to adjust the slidewire resistance and pen carriage of the instrument, in accordance with the deflection of a galvanometer connected to the potentiometer circuit. In such potentiometric uses of the invention, the galvanometer actuating current is ordinarily minute, and the galvanometer impulse correspondingly small, and the galvanometer actuating current or a minute controlling current regulated by the galvanometer, may advantageously be amplified for the purposes of the present invention by the use of electronic amplifying means.

In accordance with a preferred embodiment of the invention two sources of fluctuating light which become bright and dark in alternations, one source being bright while the other source is dark, are provided for illuminating a single light sensitive device, and the light sensitive device is selectively exposed to light from one or the other of the sources or shielded from both accordingly as a galvanometer deflects in one direction or the the other from a neutral position or assumes said neutral position. Fluctuating light falling on the light sensitive device produces a pulsating electromotive force in the latter which may be readily amplified and the amplified electromotive force is employed to control the energization of a reversible electrical motor. As will be clear, the pulsating electromotive force produced in the light sensitive device when the latter is exposed to light from one of the sources mentioned will be displaced 180° in phase from that produced in the light sensitive device when the latter is exposed to light from the other source, and when the light sensitive device is shielded from both of the sources, the pulsating component of the electromotive force induced therein will be reduced to zero.

The electronic amplifying means referred to above for controlling the energization of the reversible electrical motor includes two parallel paths which are so energized as to be electrically conductive only during alternate periods of time, the frequency of said periods being the same as that of the pulsating electromotive force adapted to be produced in said light sensitive device on deflection of said galvanometer. A winding of the motor which tends to effect forward rotation thereof when energized is connected in one of said paths, and a winding of the motor which tends to effect reverse rotation thereof when energized is connected in the other of said paths. An electronic valve the conductivity of which is adapted to be varied in accordance with the pulsations of the electromotive force produced in said light sensitive device is connected in a common return circuit of said parallel paths and is adapted to vary the conductivity of said paths during the periods when said paths are conductive, and thereby the selective energization of the forward and reverse windings of the motor. That is to say, on deflection of the galvanometer in one direction, the pulsating electromotive force produced in the light sensitive device will cause the said electronic valve to be more conductive for periods corresponding to periods when the parallel path including the forward winding of the motor is adapted to be conductive. During the alternate periods the said electronic valve will be less conductive whereby the forward winding of the motor will predominate and cause rotation of the motor in the forward direction. On deflection of the galvanometer in the opposite direction, the pulsating electromotive force produced in the light sensitive cell will be displaced 180° in phase and, therefore, the electronic valve will be more conductive during the periods when the parallel path including the reverse motor winding is conductive and less conductive during the periods when the parallel path including the forward motor winding is conductive whereby reverse rotation of the motor will be produced. When the galvanometer is in its neutral position the electronic valve will not vary in conductivity and the forward and reverse windings of the motor will be alternately and equally energized and the motor will remain stationary.

As will become apparent, I have provided a system in which a single light sensitive device is capable of controlling the selective operation of a reversible motor without the agency of relays having mechanically moving parts, and since a single light sensitive cell may be employed to produce the desired motor energizing effects, it will be clear the system is not dependent upon the individual characteristics of light sensitive cells. It is noted furthermore, that, since the system is dependent upon the derivation of a pulsating electromotive force in the light sensitive cell of one phase or of the opposite phase for producing the desired motor energizing effects, changing cell characteristics will have no effect on the operation of the system.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

Of the drawings:

Figs. 8-10 illustrate in detail a modification of the arrangement illustrated in detail in Figs. 2-7;

Figs. 11 and 12 illustrate two typical damping devices which may be employed with the arrangement of Fig. 1; and Fig. 13 is a diagrammatic view illustrating the use of my invention in a control system.

Figure 1:
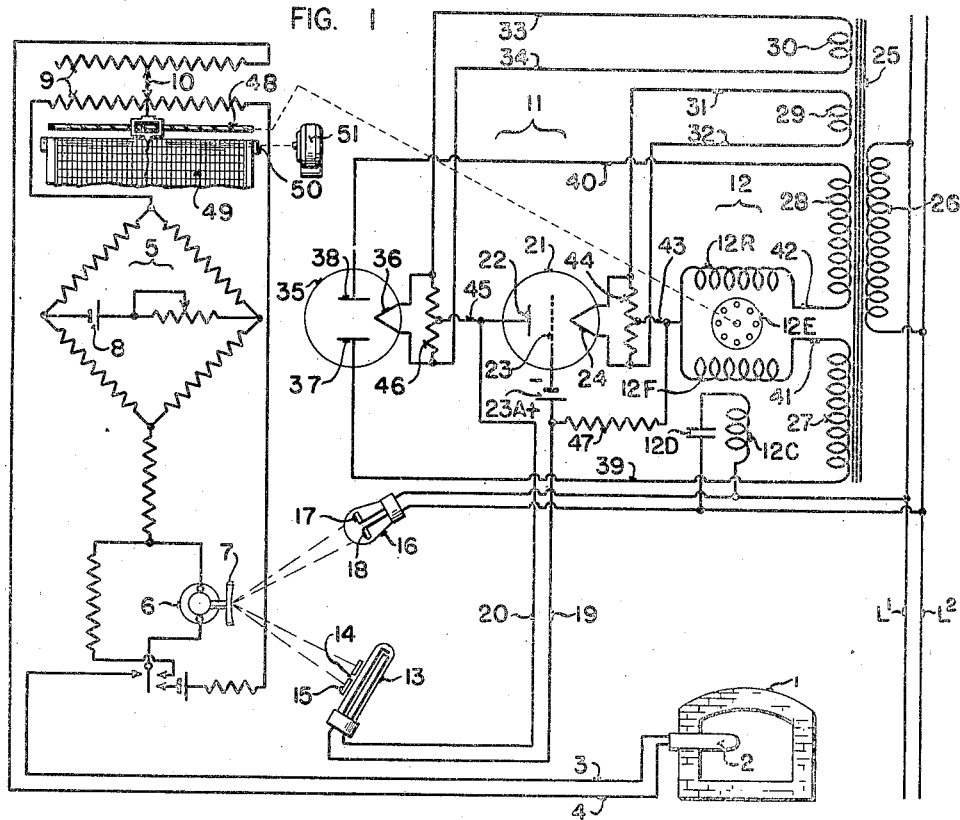
Fig. 1 is a diagrammatic view illustrating one embodiment of the invention as adapted for use in measuring and recording the temperature in a furnace.

In Fig. 1 of the drawings I have illustrated, more or less diagrammatically, a pyrometer for measuring and recording the temperature of the interior of a furnace 1. As illustrated, a thermocouple 2 is arranged in the interior of the furnace and the terminals of the thermocouple are connected by conductors 3 and 4 to the terminals of a null point potentiometric network 5 which may be of any suitable type such as the Brown potentiometric circuit disclosed in my prior Patent 1,898,124, issued February 21, 1933. The moving coil of a galvanometer 6, which is of the reflecting type and equipped with a mirror 7, is connected in the conductor 3. The turning of the galvanometer moving coil is desirably restricted by mechanical stops (not shown).

The potentiometric circuit 5 is of a well-known type, and it is sufficient for the present purposes to note that the potentiometric circuit includes a circuit branch including the thermocouple 2, an opposing circuit branch including a source of known potential such as a battery 8, and resistors 9, a variable portion of which may be connected into the opposed branches by means of a sliding contact 10 whereby the respective effects of the variable and known sources are made equal and opposite, and the galvanometer moving coil is thus rendered undeflected when the circuit is balanced for a given value of the E. M. F. of the thermocouple 2 with the contact 10 in a corresponding position along resistors 9. The position of contact 10 is then a measure of the value of the thermocouple E. M. F. and may then serve as a measure of the temperature to which it is exposed.

In the embodiment illustrated in Fig. 1, my invention is specifically concerned with the means by which the contact 10 is adjusted back and forth along resistors 9 in response to a galvanometer deflection, and, as shown, includes an electronic amplifier 11 and a reversible electrical motor 12, the rotation and direction of rotation of which is adapted to be selectively controlled by amplifier 11. Motor 12 is connected in any convenient manner to contact 10 for adjusting the latter along resistors 9, and as will be clear, amplifier 11 is employed for selectively controlling the motor rotation in response to a feeble pulsating voltage which is derived, in a manner to be presently explained, as a result of galvanometer deflection.

A photoelectric cell 13, which is preferably mounted in a casing (not shown) so as to be shielded from all external light except that permitted to pass through a narrow slot 14 in a shield 15 which may or may not comprise part of the casing, as desired, is connected to the input terminals of amplifier 11 and is adapted to be selectively exposed to one or the other of two beams of light which emanate from respective plates 17 and 18 of a neon lamp 16. Neon lamp 16 includes two plates 17 and 18 which are preferably positioned in the same plane and may desirably be in the form of half moons. One plate is connected to the alternating current supply conductor $L^1$ and the other plate is connected to the alternating current supply conductor $L^2$. Plates 17 and 18 light up in rapid alternation at a frequency corresponding to that of the alternating current supply conductors, one plate being bright while the other is dark. The light beams emanating from each plate are reflected towards photoelectric cell 13 by mirror 7 which is carried by galvanometer 6, and when the latter is deflected in one direction or the other from its neutral position, one or the other of the beams is reflected through slot 14 of shield 15 onto cell 13.

Figure 2:
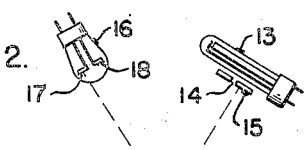
Figs. 2-7 illustrate in detail the manner in which galvanometer deflection exposes the light responsive element of Fig. 1 to one or the other of the plates of a neon lamp or shields the element from both plates.
Figure 3:
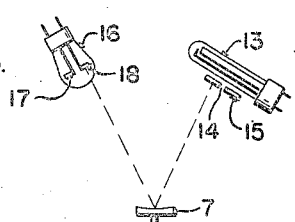
Figure 4:
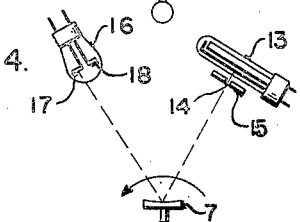
Figure 5:
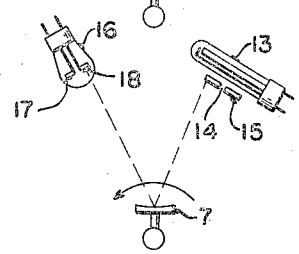
Figure 6:
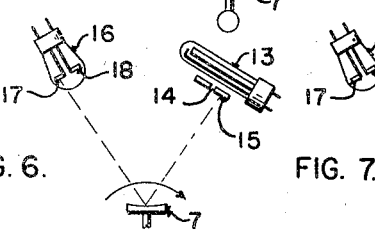

The manner in which the deflection of galvanometer 6 from its neutral position operates to derive a pulsating voltage in photoelectric cell 13 is best described in connection with Figs. 2–7. As illustrated in Figs. 2 and 3, the galvanometer mirror is indicated in its undeflected position. In Figs. 4 and 5 mirror 7 is indicated as deflected in a counterclockwise direction from its undeflected position, and in Figs. 6 and 7, is indicated as deflected in a clockwise direction from its undeflected position.

Referring to Fig. 2, in which plate 17 is shown illuminated, it will be noted that the light beam emanating therefrom is reflected from mirror 7 onto shield 15 to the right of slot 14 so that no light impinges on photoelectric cell 13. In Fig. 3, in which plate 18 is shown illuminated, it will be noted that the light beam therefrom is reflected by mirror 7 onto shield 15 to the left of slot 14 so that in this case also no light impinges on photoelectric cell 13. Thus, when mirror 7 is in its undeflected position, photoelectric cell 13 remains dark during the alternate illumination of neon lamp plates 17 and 18 whereby the current conducted by the cell remains a steady predetermined value.

In Fig. 4, as indicated by the arrow, mirror 7 is deflected counterclockwise from its undeflected position to a position in which light emanating from neon lamp plate 17 is reflected by mirror 7 through slot 14 onto photoelectric cell 13. When plate 18 is illuminated and plate 17 is dark, however, as illustrated in Fig. 5, light is reflected from plate 18 by mirror 7 onto shield 15 at a position to the left of slot 14. Thus, when mirror 7 is in this position, light will be impinged on photoelectric cell 13 during the intervals when plate 17 is illuminated, or in other words cell 13 will be exposed to intermittent flashes of light having a frequency equal to that of the supply conductors $L^1$ and $L^2$.

Figure 7:
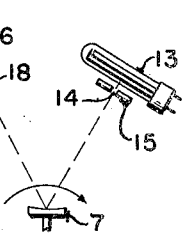

As indicated in Fig. 7 by the arrow, mirror 7 is deflected clockwise from its undeflected position to a position in which light emanating from neon lamp plate 18 is reflected by mirror 7 through slot 14 onto photoelectric cell 13. When plate 17 is illuminated and plate 18 is dark, however, as shown in Fig. 6, light is reflected from plate 17 by mirror 7 onto shield 15 at a position to the right of slot 14. Thus, when mirror 7 is deflected clockwise from its undeflected position, photoelectric cell 13 will be exposed to intermittent flashes of light having a frequency equal to that of supply conductors $L^1$ and $L^2$ and it will be noted, the periods or phase of the flashes are opposite from those to which the cell is subjected when the mirror 7 is deflected in a counterclockwise direction from its undeflected position.

As will be readily apparent the emission of photoelectric cell 13 is changed in accordance with the phase of the flashes of light impinging thereon and produces across the terminals of the photoelectric cell a pulsating E. M. F. which may be readily amplified by the amplifier 11 and the amplified quantity is employed to selectively control the rotation of motor 12 to effect the desired rebalancing adjustments of contact 10 along resistors 9 and thereby restoration of the galvanometer moving coil to its normal, undeflected position.

The means for amplifying the pulsating E. M. F.'s produced across photoelectric cell 13 includes conductors 20 and 19 connecting the anode and photocathode, respectively, of cell 13 to the input terminals of an electronic valve 21. Electronic valve 21 is a filament type triode and includes an anode 22, a control grid 23 and filament cathode 24 and, as shown, conductor 20 is connected to anode 22 and conductor 19 is connected to control grid 23.

Energizing voltages are supplied amplifier 11 and photoelectric cell 13 from a transformer 25 which is a combination step-up and step-down transformer having a primary winding 26 connected between alternating supply conductors $L^1$ and $L^2$, and having two high voltage windings 27 and 28 and two low voltage windings 29 and 30. Low voltage secondary winding 29 supplies current through conductors 31 and 32 to the filament cathode 24 of valve 21 and low voltage secondary winding 30 supplies current through conductors 33 and 34 to the filament cathode 36 of a rectifier valve 35. Rectifier valve 35 may be, and is shown as, of standard type and includes a pair of anodes 37 and 38 in addition to the filament cathode 36. One terminal of the high voltage transformer secondary winding 27 is connected by a conductor 39 to the anode 37 and a terminal of the high voltage winding 28 of opposite polarity is connected by a conductor 40 to the anode 38. Thus, the potentials of anodes 37 and 38 will be swung alternately positively and negatively at a frequency equal to that of the supply line frequency, one anode being positive while the other is negative.

The other terminal of the high voltage winding 27 is connected by a conductor 41 to one end of a motor winding 12F and the other terminal of high voltage winding 28 is connected by a conductor 42 to one end of a motor winding 12R. Motor windings 12F and 12R are opposed windings and when selectively energized cause rotation of motor 12 in a forward and a reverse direction, respectively. The other ends of windings 12F and 12R are connected together and are connected by a conductor 43 to a center tap on a resistor 44 which is connected in shunt to the filament cathode 24 of valve 21. Anode 22 of valve 21 is connected by a conductor 45 to a center tap on a resistor 46 connected in shunt with the filament cathode 36 of rectifier valve 35.

The motor 12 may be of the well-known capacitor induction variety having a main winding 12C continuously energized from the supply conductors $L^1$ and $L^2$ through a condenser 12D of suitable value, a squirrel cage rotor 12E, the opposed windings 12F and 12R, and a core (not shown), common to all the windings. The winding 12C and the opposed windings 12F and 12R are spaced in quadrature and so wound on the core that when the winding 12F is energized, a rotating field will be set up in the squirrel cage rotor 12E in one direction and when the winding 12R is energized, a rotating field will be set up in the rotor in the opposite direction thereby actuating the rotor 12E for rotation in a corresponding direction.

It is noted that full wave rectified current is supplied valve 21 due to the rectifying action of valve 35, but that only half wave rectified current can pass through windings 12F and 12R of motor 12. This is brought about since valve 21 is energized during one half cycle of the supply conductor voltage by the transformer secondary winding 27, during which half cycle the motor winding 12F is energized, and during the second half cycle of the supply conductor voltage, valve 21 is energized by the secondary winding 28, during which half cycle, the motor winding 12R will be energized.

As previously noted, the anode and photocathode of photoelectric cell 13 are connected to the anode 22 and control grid 23, respectively, of valve 21, and as shown, a resistor 47 of suitable value is desirably connected between the control grid 23 and the filament cathode 24. A suitable battery 23A may be provided for supplying negative bias to the control grid 23. It will be seen that the connection of the photoelectric cell 13 and resistor 47 forms a circuit which shunts the anode 22 and cathode 24 of valve 21 whereby photoelectric cell 13 is energized from the same voltage source as valve 21.

I contemplate two modes of operation of motor 12 in the system illustrated in Fig. 1. In accordance with one method, the voltage of battery 23A is so chosen that the normal current conducted by valve 21 is an appreciable value whereby the motor windings 12F and 12R are alternately energized and motor 12 is actuated for rotation in opposite directions in rapid alternation and will remain stationary. This is the case when galvanometer 6 is in its normal, undeflected position. When the galvanometer deflects in one direction or the other from its normal position, in a counterclockwise direction, for example, photoelectric cell 13 will be exposed to the intermittent flashes of light from neon lamp plate 17 and a positive potential will be applied to control grid 23 during the half cycles when anode 37 of rectifier valve 35 is positive. As will be clear the average value of current passing through motor winding 12F will then predominate over that passing through winding 12R and accordingly motor 12 will be actuated for rotation in a forward direction. Similarly, when photo-electric cell 13 is exposed to the flashes of light originating at neon lamp plate 18, a positive potential will be applied to control grid 23 during the half cycles when anode 38 of valve 35 is positive. The average value of current passing through motor winding 12R will then predominate over that passing through motor winding 12F and motor 12 will be actuated for rotation in the reverse direction.

In accordance with the second mode of operation which I contemplate, the voltage of battery 23A is so chosen that the normal current conducted by valve 21 is a negligible value whereby the motor windings 12F and 12R will both be deenergized when the galvanometer 6 is in its undeflected position. Upon deflection of the galvanometer in one direction or the other, one or the other of windings 12F and 12R will be energized and motor 12 will be actuated for rotation in a corresponding direction.

As illustrated in Fig. 1, the shaft of motor 12 is connected in any convenient manner to a shaft 48, which may desirably be a rod having a spiral groove thereon, and the potentiometer contact 10 is mounted on a carriage carried by shaft 48 and is adapted to be moved in one direction or the other as the shaft 48 is rotated. Thus, when motor 12 is actuated for rotation as a result of galvanometer deflection, the motor effects an adjusting movement of the contact 10 along the slidewire resistors 9 in the proper direction until the potentiometer and thermocouple voltages are exactly balanced. The unbalanced current flow through galvanometer 6 will then be reduced to zero and the latter will return to its normal, undeflected position whereupon the motor will come to rest with contact 10 at a new position along resistors 9, which position will then be a measure of the temperature of the interior of furnace 1.

Desirably a pen mounted on the carriage which carries the potentiometer contact 10 is arranged to cooperate with a recorder chart 49 and to thereby provide a continuous record of the temperature of the interior of furnace 1. The recorder chart is adapted to be driven by a continuously rotating roller 50 and the latter is driven in any convenient manner, as for example, by a unidirectional motor 51 through suitable gearing (not shown), so that a record of the temperature of the interior of furnace 1 will be had as a continuous line on the chart.

In Figs. 8–10 I have illustrated in detail, more or less diagrammatically, a modification of the arrangement illustrated in detail in Figs. 2–7 for shielding photoelectric cell 13 from both plates of neon lamp 16 when the galvanometer is in its undeflected position and for selectively exposing the cell to light from one or the other of the plates when the galvanometer deflects in one direction or the other from that position. In this modification shields 52 and 53 are positioned directly in front of neon lamp 16 in such manner that diametrically opposed halves of plates 17 and 18 are shielded. Similar shields 54 and 55 are positioned directly in front of photoelectric cell 13 in such manner that the photocathode of the latter is divided into four equal rectangles, diametrically opposed rectangles being shielded by parts 54 and 55 and the remaining rectangles unshielded and arranged to be selectively exposed to the corresponding unshielded sections of neon lamp 16.

As illustrated in Fig. 8 in which mirror 7 is shown in its undeflected position, it will be seen that the quarter moons reflected by the mirror toward cell 13 from plates 17 and 18 fall upon the respective shields 54 and 55 and in this position of mirror 7, cell 13 will remain dark. In Fig. 9 mirror 7 is shown partially deflected in a counterclockwise direction, in which position it will be noted that light from plate 17 is reflected onto cell 13. The intermittent flashes of light thus directed onto cell 13 will operate to cause rotation of motor 12 in a forward direction in the manner already described in connection with Fig. 1. In Fig. 10 mirror 7 is shown partially deflected in a clockwise direction, in which position light from plate 18 is reflected onto cell 13, and it will be apparent motor 12 will then be actuated for rotation in a reverse direction.

It is noted that in this modification that the amplitude of the E. M. F. induced in photoelectric cell 13 will be proportional to the deflection of mirror 7. As shown in Fig. 9, for example, mirror 7 is only deflected slightly from its normal position, and as a result only a portion of the light from neon lamp plate 17 is directed on cell 13, but it will be apparent that upon greater deflection of mirror 7 that more of the light from plate 17 will fall on the cell. The emissivity of cell 13 will then be proportional to the deflection of mirror 7 and thereby the amplitude of the energizing current to motor winding 12F and consequently the speed of rotation of the latter will be proportional to the deflection of mirror 7.

In order that the speed of motor 12 may be as great as possible during rebalancing without overshooting of the balance point and consequent hunting taking place, means may be provided to ensure that the motor speed and the rate of change of its speed is substantially proportional to the extent of unbalance. Such means are desirable unless the motor has a suitable damping characteristic of its own and may be embodied in the devices shown in Figs. 11 and 12, for example. In Fig. 11, a disc 56, which may be of copper, is fastened to the shaft of motor 12 for rotation within a magnetic field as provided, for example, by a permanent magnet 57. Magnet 57 is carried at one end of a vane 58, and a shield 15 which may be integral with vane 58 is carried at the other end of the latter and arranged in cooperative relation with photoelectric cell 13. Vane 58 is carried by a shaft 59 and the latter is pivoted for rotation in suitable bearings (not shown). When disc 56 is stationary and the galvanometer mirror 7 is in its undeflected position, vane 58 assumes a center position with respect to cell 13 such that shield 15 blocks all light from neon lamp 16 from the cell. If desired, a suitable spring member 60 may be provided for normally holding vane 58 in this central position.

As will be clear, upon deflection of mirror 7, light from either neon lamp plate 17 or 18 will pass through slot 14 of shield 15 and will cause motor 12 to be energized for rotation in a corresponding direction. Magnetic reaction between magnet 57 and disc 56 rotating between the poles of magnet 57 will then exert a drag on the latter which is in the proper direction to move shield 15 in the direction to intercept the light falling on cell 13.

If the potentiometric unbalance is slight and thereby the deflection of mirror 7 from its neutral position is slight, the beam will be entirely intercepted by shield 15 and motor 12 will be deenergized. The resulting decrease in motor speed will cause a corresponding reduction in the drag exerted on vane 58 by disc 56 and the vane will return toward its normal central position. If the motor rotation has not been sufficient to rebalance the potentiometric network 5, mirror 7 will still be deflected from its normal position and accordingly motor 12 will again be energized for rotation. The subsequent deflection of vane 58 from its normal central position will again operate to shield photoelectric cell 13 from neon lamp 16 and thereby to cause deenergization of motor 12. Thus, when the potentiometric network 5 is slightly unbalanced, the energizing current flow to motor 12 which is causing rotation of the latter will intermittently be cut off whereby the motor will gradually slow down and the potentiometer contact will come to rest at the exact balance point.

As will be clear, if the system is appreciably unbalanced, mirror 7 will be deflected to a greater extent and upon deflection of vane 58, the light to photoelectric cell 13 will not be cut off. It should be noted that the individual beams of light emanating from neon lamp plates 17 and 18 have a width equal to that of the plates and that they are separated by a distance preferably slightly greater than the width of slot 14. Thus, when vane 58 is in its undeflected position, the space between plates 17 and 18 will be reflected on slot 14 and the light from the plates will be reflected on shield 15. As will be apparent the maximum deflection of mirror 7 may be so adjusted with respect to the maximum deflection of vane 58 that when the mirror is deflected to its fullest extent, photoelectric cell 13 will still be exposed to light from neon lamp 16 whereby motor 12 will be continuously energized.

It will thus be clear that on an appreciable change in temperature in the interior of furnace 1, motor 12 will be continuously energized and effect rapid adjustment of potentiometer contact 10 along resistors 9 until the thermocouple E. M. F. is almost balanced, and as the balance point is approached, the energization of motor 12 will be intermittently interrupted as described hereinbefore, and the speed thereof will be reduced and contact 10 will come to rest at the exact balance point.

In Fig. 12 a vane 58 which may be similar to the correspondingly identified part of Fig. 11 is pivoted for rotation on a shaft 60 and a blade 61 integral with vane 58 is arranged in cooperative relation with a fan 62 which is carried by the shaft of motor 12. It will be clear that when motor 12 is energized for rotation, fan 62 will exert a drag on blade 61 and thereby cause deflection of vane 58 from its central position.

Although the devices illustrated in Figs. 11 and 12 for damping motor 12 have been described in connection with the arrangement shown in Fig. 1, and shown in detail in Figs. 2–7 for exposing cell 13 to one of neon lamp plates 17 or 18 upon deflection of mirror 7, it will be readily apparent that these motor damping devices may be employed with equal facility with the arrangement disclosed in Figs. 8–10.

It will be apparent that motor 12 may be employed to operate a control valve or a rheostat for governing the application of an agent to a furnace for producing heat, for example to which the thermocouple 2 is responsive, or another motor desirably operated together with motor 12 may be so employed. For example, as shown in Fig. 13, a furnace 1, to the temperature of which thermocouple 2 is responsive, is heated by a resistor 63 which is connected to electric supply conductors $L^3$ and $L^4$ through a rheostat 64, the adjustment of which is effected by a motor 65. The motor 65 may be exactly like motor 12 and is shown connected in parallel therewith. The mechanical connection of the rheostat 64 to the motor 65 is such as to decrease and increase the supply of electric current to resistor 63 as the temperature of furnace 1 rises above or drops below a predetermined level.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. In a motor control system, a reversible rotating field motor having a plurality of windings, an alternating voltage source of predetermined frequency, permanent connections between the ends of a first one of said motor windings and said alternating voltage source, a pair of electrical paths having a common connection, a second one of said motor windings being permanently connected in one of said paths and a third one of said motor windings being permanently connected in the other of said paths, means connected to said one of said paths to intermittently energize said one path at the frequency of said alternating voltage source, means connected to the other of said paths to intermittently energize the other of said paths at said frequency, the intervals of energization of said other path alternating with the intervals of energization of said one path, a device connected in said common connection the conductivity of which is adapted to be varied, and means to cyclically vary the conductivity of said device at the frequency of said alternating voltage source.

2. In a motor control system, a reversible rotating field motor having a plurality of windings, an alternating voltage source of predetermined frequency, a condenser, permanent connections between the ends of a first one of said motor windings and said alternating voltage source including said condenser, a pair of electrical paths having a common connection, a second one of said motor windings being permanently connected in one of said paths and a third one of said motor windings being permanently connected in the other of said paths, means connected to said one of said paths to intermittently energize said one path at the frequency of said alternating voltage source, means connected to the other of said paths to intermittently energize the other of said paths at said frequency, the intervals of energization of said other path alternating with the intervals of energization of said one path, an electronic valve having an output circuit connected in said common connection and an input circuit, and means to selectively apply a potential fluctuating at the frequency of said alternating voltage source and in phase or substantially 180° out of phase therewith on the input circuit of said electronic valve.

3. In a motor control system, a reversible rotating field motor having a plurality of windings, an alternating voltage source of predetermined frequency, a condenser, permanent connections between the ends of a first one of said motor windings and said alternating voltage source including said condenser, a transformer having a primary winding and a pair of secondary windings, connections between the ends of said transformer primary winding and said alternating voltage source, a full wave rectifier valve having a pair of anodes and a cathode common to both of said anodes, a connection from one of said anodes to one terminal of one of said transformer secondary windings, a connection from the other of said anodes to one terminal of the other of said transformer secondary windings, a permanent connection from said cathode to the other terminal of said one transformer secondary winding including a second one of said motor windings, a permanent connection from said cathode to the other terminal of said other transformer secondary winding including a third one of said motor windings, said transformer secondary windings being so wound on said transformer that current alternately flows through said cathode connection from one secondary winding and then the other secondary winding, said cathode connection including a device the conductivity of which is adapted to be varied, and means to cyclically vary the conductivity of said device at the frequency of said alternating voltage source.

4. In a motor control system, a reversible rotating field motor having a plurality of windings, an alternating voltage source of predetermined frequency, a condenser, permanent connections between the ends of a first one of said motor windings and said alternating voltage source including said condenser, a transformer having a primary winding and a pair of secondary windings, connections between the ends of said transformer primary winding and said alternating voltage source, a full wave rectifier valve having a pair of anodes and a cathode common to both said anodes, a connection from one of said anodes to one terminal of one of said transformer secondary windings, a connection from the other of said anodes to one terminal of the other of said transformer secondary windings, a permanent connection from said cathode to the other terminal of said one transformer secondary winding including a second one of said motor windings, a permanent connection from said cathode to the other terminal of said other transformer secondary winding including a third one of said motor windings, said transformer secondary windings being so wound on said transformer that current alternately flows through said cathode connection from one secondary winding and then the other secondary winding, said cathode connection including the output circuit of an electronic valve having an input circuit, and means to selectively apply a potential fluctuating at the frequency of said alternating voltage source and in phase or substantially 180° out of phase therewith on the input circuit of said electronic valve.

5. In a motor control system, a reversible rotating field motor having a plurality of winding means, an alternating voltage source of predetermined frequency, permanent connections between a first one of said motor winding means and said alternating voltage source, a transformer having a primary winding and a pair of secondary windings, connections between the ends of said transformer primary winding and said alternating voltage source, a full wave rectifier valve having a pair of anodes and a cathode common to both of said anodes, a connection from one of said anodes to one terminal of one of said transformer secondary windings, a connection from the other of said anodes to one terminal of the other of said transformer secondary windings, permanent connecting means from said cathode to the other terminals of said transformer secondary windings including another of said motor windings means, said transformer secondary windings being so wound on said transformer that current is alternately adapted to flow through said cathode connecting means from one secondary winding and then from the other secondary winding, said cathode connecting means including the output circuit of an electronic valve having an input circuit, and means to selectively apply a potential fluctuating at the frequency of said alternating voltage source and in phase or substantially 180° out of phase therewith on the input circuit of said electronic valve.

6. In a motor control system, a reversible rotating field motor having a plurality of winding means, an alternating voltage source of predetermined frequency, permanent connections between a first one of said motor winding means and said alternating voltage source, a transformer having a primary winding and a pair of secondary windings, connections between the ends of said transformer primary winding and said alternating voltage source, a pair of rectifier means having a common terminal, said rectifier means being characterized by the fact that electric current is adapted to flow away from said common terminal only, a connection from the other terminal of one of said rectifier means to one terminal of one of said transformer secondary windings, a connection from the other terminal of the other of said rectifier means to one terminal of the other one of said transformer secondary windings, connecting means from the common terminal of said rectifier means to the other terminals of said transformer secondary windings including another of said motor winding means, said transformer secondary windings being so wound on said transformer that current is alternately adapted to flow through said connecting means from one secondary winding and then the other, said connecting means including a device the conductivity of which is adapted to be varied, and means to cyclically vary the conductivity of said device at the frequency of said alternating voltage source.

7. In a motor control system, a reversible rotating field motor having a plurality of winding means, an alternating voltage source of predetermined frequency, permanent connections between a first one of said motor winding means and said alternating voltage source, a transformer having a primary winding and a pair of secondary windings, connections between the ends of said transformer primary winding and said alternating voltage source, a full wave rectifier valve having a pair of anodes and a cathode common to both of said anodes, a connection from one of said anodes to one terminal of one of said transformer secondary windings, a connection from the other of said anodes to one terminal of the other of said transformer secondary windings, permanent connecting means from said cathode to the other terminals of said transformer secondary windings including another of said motor winding means, said transformer secondary windings being so wound on said transformer that current is alternately adapted to flow through said cathode connecting means from one secondary winding and then from the other secondary winding, and means associated with said rectifier valve means to control the relative magnitudes of the current flows through said cathode connecting means from said transformer secondary windings.

8. In a motor control system, a reversible rotating field motor having a plurality of winding means, an alternating voltage source of predetermined frequency, permanent connections between a first one of said motor winding means and said alternating voltage source, a transformer having a primary winding and a pair of secondary windings, connections between the ends of said transformer primary winding and said alternating voltage source, permanent connecting means between said pair of transformer secondary windings and another of said motor winding means, means including electronic valve means associated with said connecting means to control the flow of current through said connecting means, said transformer secondary windings and said last mentioned means being so constructed that current is alternately adapted to flow through said connecting means from one secondary winding and then from the other secondary winding, and means to cyclically vary the conductivity of said electronic valve means at the frequency of said alternating voltage source.

THOMAS R. HARRISON.